US011347493B2

(12) United States Patent
Punja et al.

(10) Patent No.: US 11,347,493 B2
(45) Date of Patent: May 31, 2022

(54) SYSTEMS AND METHODS TO AUTO DOWNLOAD APPLICATIONS FROM A WEBSITE BASED ON USER CONTEXT (71) Applicant: Rovi Guides, Inc., San Jose, CA (US)

(72) Inventors: Deviprasad Punja, Bangalore (IN); Madhusudhan Srinivasan, Bangalore (IN)

(73) Assignee: ROVI GUIDES, INC., San Jose, CA (US)

(*) Notice: Subject to any disclaimer, the term of this patent is extended or adjusted under 35 U.S.C. 154(b) by 12 days.

(21) Appl. No.: 16/832,862

(22) Filed: Mar. 27, 2020

(65) Prior Publication Data

US 2021/0303285 A1  Sep. 30, 2021

(51) Int. Cl.
*G06F 8/61* (2018.01)
(52) U.S. Cl.
CPC ..................... *G06F 8/61* (2013.01)
(58) Field of Classification Search
CPC .......................................................... G06F 8/61
See application file for complete search history.

(56) References Cited

U.S. PATENT DOCUMENTS

| 10,467,304 B1* | 11/2019 | Lin | H04L 67/10 |
| 2008/0270551 A1* | 10/2008 | Flake | G06Q 10/10 |
| | | | 709/206 |
| 2012/0042036 A1* | 2/2012 | Lau | H04W 4/60 |
| | | | 709/217 |
| 2014/0068011 A1* | 3/2014 | Zhang | G06N 5/02 |
| | | | 709/219 |
| 2015/0065170 A1* | 3/2015 | Brisebois | H04M 1/72525 |
| | | | 455/456.3 |
| 2016/0162270 A1* | 6/2016 | Kumar | G06F 3/0488 |
| | | | 717/177 |
| 2017/0060608 A1* | 3/2017 | Raghunathan | G06F 11/3006 |
| 2018/0232213 A1* | 8/2018 | Greene | G06Q 40/02 |
| 2020/0186959 A1* | 6/2020 | Montreuil | G06F 16/24575 |

OTHER PUBLICATIONS

Singh et al, "ZapDroid: managing infrequently used applications on smartphones", 2017, [Online], pp. 1475-1489, [Retrieved from internet on Jan. 19, 2022], <https://ieeexplore.ieee.org/stamp/stamp.jsp?arnumber=7513379> (Year: 2017).*

* cited by examiner

*Primary Examiner* — S. Sough
*Assistant Examiner* — Zengpu Wei
(74) *Attorney, Agent, or Firm* — Haley Guiliano LLP (57) ABSTRACT

Systems and methods for temporarily downloading an application program from a website are disclosed herein. The website provides a feature set corresponding to an anticipated user activity and a downloadable application program. The anticipated user activity is identified based on user data corresponding to future activities of a user. A correspondence between the anticipated user activity and the website is determined and the application program is retrieved from the website and installed on the user device. In response to detecting absence of a user interaction with the application program on the user device within a predefined time period, the application program is automatically uninstalled from the user device.

20 Claims, 9 Drawing Sheets

SYSTEMS AND METHODS TO AUTO DOWNLOAD APPLICATIONS FROM A WEBSITE BASED ON USER CONTEXT

BACKGROUND

The present disclosure relates to temporary retrieval of application programs and, more particularly, to systems and methods related to temporary retrieval of application programs from public websites.

SUMMARY

Public websites with gained sophistication throughout recent years fuel the engine behind our modern-day information infrastructure. They occupy a special and important function in helping to advance human activity, interaction, and efficiency by providing real-time, offline, and online information for consumption. Users of application-enabled devices routinely frequent websites to meet their everyday demands and interests, such as catching up with friends and family, purchasing entertainment tickets, managing transportation schedules, and consuming media assets. Media content consumers, for example, rely on public provider websites (e.g., Netflix, Hulu, Comcast, or TV Guide) for content selection and recording; airline travel consumers rely on public airline websites for booking, check-ins, and flight status; auto travelers rely on public ride-sharing websites for ride-sharing arrangements; and train passengers rely on public transportation websites for train schedules. Websites can cast an even wider information net reaching the likes of the worlds of sports, weather, and education. E-learning, as an example, has transformed the age-old paper learning experience into a web-based one.

It is therefore no accident that a typical user device includes a multitude of user- and manufacturer-installed application programs. Each application program serves as an eye into a respective website. Information in the form of feature sets is directly accessible from a website or indirectly accessible from a corresponding downloadable application program from a website. Indeed, an enhanced feature set relative to its counterpart website feature set may be available with an application program download onto a user device. That is, the application program is tooled with an enhanced feature set, whereas its corresponding website is tooled with a simple or reduced feature set. One motivation behind the enhanced feature set is to encourage application program downloads. With each program download, a website owner gleans gainful user information, grows content usage, and perhaps most notably increases the likelihood of advertisement campaigns reaching the user—a remarkably profitable modern-day practice. Accordingly, website developers build websites that insist on application downloads, leaving the burdensome management and cluttered device displays associated with downloaded applications to the user.

As expected, users are typically less than eager to engage in routine application cleanups. Consequently, application programs are permanently (or semi-permanently) housed in user devices, occupying valuable display real estate and adding to a growing source of user frustration. Even in the face of routine cleanups, users are bogged down with downloading, installing, uninstalling, and reinstalling application programs and, at times, for a mere one-time, temporary information access. For example, the occasional public transportation rider may download a train station application from a city website for a one-time train schedule access. A student seeking to fulfill a minor graduation requirement may download a Spanish language tutorial application for a one-time online syllabus or reading material access. And, an Internet provider (e.g., Netflix, Hulu, Comcast, or TV Guide) subscriber may download a subscription application from a public provider website for a one-time sporting match schedule access. In all three cases, the application logos are likely to remain long-term icons of an already confusingly busy user display mosaic.

In accordance with various methods and embodiments disclosed herein, an application program corresponding to a website is temporarily downloaded from the website to a user device, installed on the user device and ultimately uninstalled from the user device, automatically. An anticipated user activity is identified based on user data corresponding to the user's future activities, and a correspondence between the anticipated user activity and the website is determined based on the user data. The website may be publicly accessible. In some cases, the website provides a feature set corresponding to the anticipated user activity; the website further provides a downloadable application program. The downloadable application program is retrieved from the website and automatically installed on the user device. Unbeknownst to the user, if a predefined time period passes in the absence of a user interaction with the downloadable application program on the user device, the downloadable application program is automatically uninstalled from the user device.

In some embodiments, the user data is generated from one or more datasets of one or more respective distinct user accounts. In a nonlimiting example, user data may be from a user social media account, a user email account, or a text-related account. Other suitable sources of user data are contemplated.

In some cases, the downloadable application program includes an enhanced feature set relative to the website feature set. For example, a transportation website may offer scheduled train arrival times, but a corresponding application program downloaded from the transportation website may offer real-time train arrival times.

In some embodiments, user access to an application program may be determinative of the relevant anticipated user activity website. The system may detect user access of a ride-sharing application to travel to a desired destination, and in response to the detected access, the system may identify an entertainment website with recommendations to entertainment sites local to the desired destination. For example, a user may contact a ride-sharing service by accessing a CarRide application installed on a user smartphone to get to Disneyland. In response to the detection of the desired destination, Disneyland, a user smartphone, benefiting from some of the disclosed embodiments and methods, may access the EntertainmentReview website for reviews of restaurants neighboring the Disneyland area. In yet another example, in response to detecting a media asset consumer access of a public provider website (e.g., Netflix, Hulu, Comcast, or TV Guide) for media content selection, the system may access a movie review section of a consumer subscribed public news media website for relevant movie reviews. In another example, the system may automatically identify an airline website based on an anticipated user air travel, as electronically calendared in a user calendar account. For example, with a user calendared trip with Fabulous Airline, the system may identify the Fabulous Airline website and download an in-flight entertainment application, the Fabulous Airline application program, from the website, hours prior to the flight, to facilitate media asset (e.g., a Netflix television series) consumption using the downloaded application program during the flight.

The anticipated user activity may be based on content entity corresponding to a category of user interests based on user preferences. That is, user preferences—previous user interests—may be cataloged into content entities of a database for determining the anticipated user activity. Sources of user interests are numerous, including user account preferences (e.g., frequented locations from a navigation website user account or music genres from a music website user account) and past user activities (e.g., user website accesses, for example, public transportation-related websites).

Automatic uninstallation of the downloadable application program from the user device may be in response to various types of events such as, without limitation, time-outs, application program content change, or user reactions. A user reaction may be sourced from captured detection and sensor devices. In some embodiments, a user reaction may be based on user sensory changes captured by one or more facial recognition devices, for example. An application program content change, such as a display change, an input change or other detectable changes may also signal a user device to uninstall the application program.

Alternatively, or additionally, a user interaction with the downloadable application program may cause an extension of the predefined time period for detecting a user interaction. For example, detection of a user keystroke input while the user accesses an application nine minutes into a 10-minute limit for detecting a user interaction may have the effect of extending the 10-minute time period by five minutes before the application is uninstalled.

In some embodiments, determining a correspondence between the anticipated user activity and the website may be based on a natural language string search. That is, finding a common text string between the anticipated user activity and the website may predict the website being relevant to the user activity. In some cases, migration of an identified application program from a website to a user device may not be practical or even legal due to restricted application program access, as noted by the website. In such cases, the system may employ the aid of a natural language processing unit to scan the website to identify potential cautionary language against downloading a corresponding application (e.g., the phrases "Restricted Access Warning!" or "Not Authorized to Download!" appearing in close proximity to an application download link).

BRIEF DESCRIPTION OF THE DRAWINGS

The above and other objects and advantages of the disclosure will be apparent upon consideration of the following detailed description, taken in conjunction with the accompanying drawings, in which.

DETAILED DESCRIPTION

The present disclosure is, in some embodiments, directed to methods and systems for automatic retrieval of application programs from corresponding websites without user intervention, and more particularly to temporary download and installation of some application programs from websites corresponding to anticipated user activities.

Figure 1:
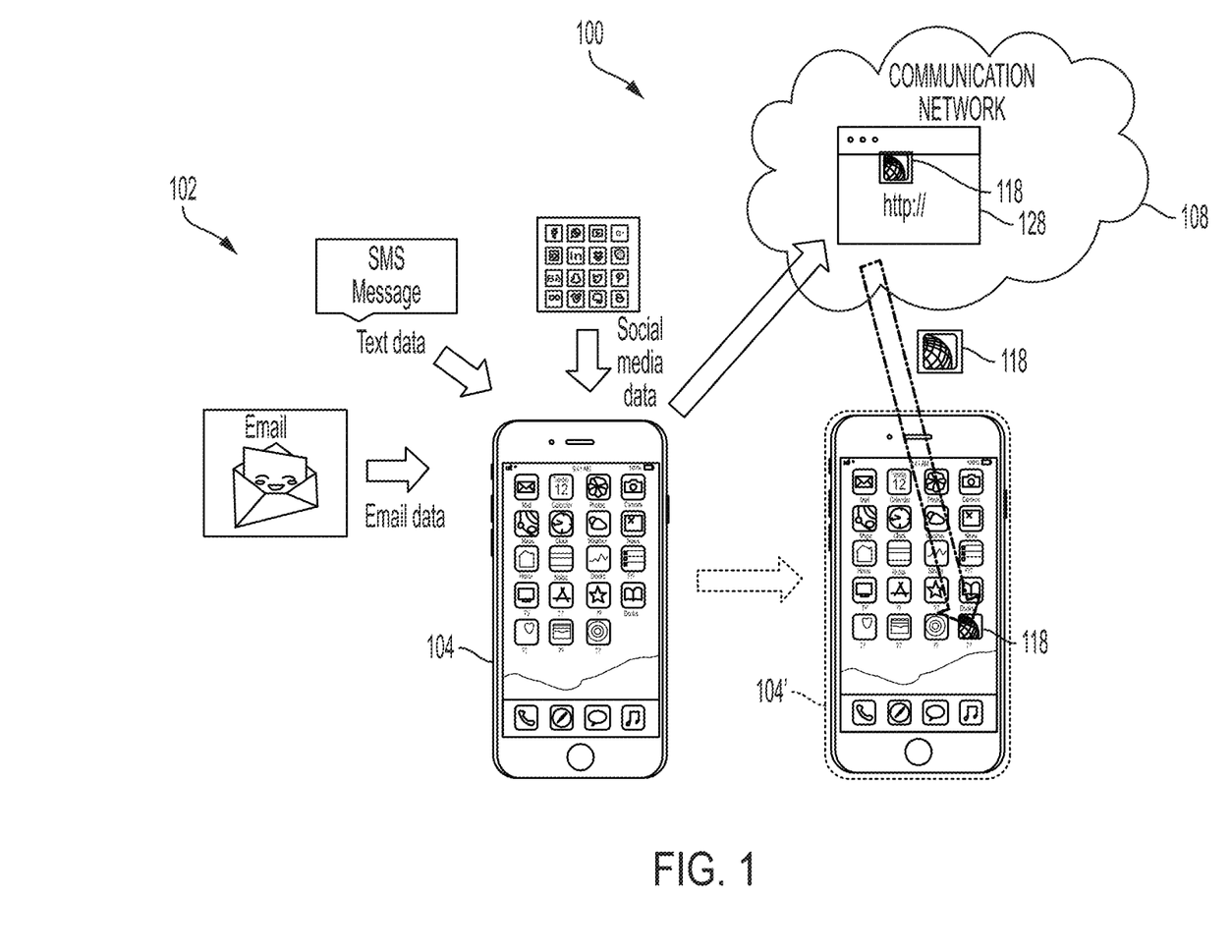
FIGS. 1-4 each show an illustrative block diagram of a distinct automatic application retrieval system, in accordance with some embodiments of the disclosure.

FIG. 1 shows an illustrative block diagram of an automatic application retrieval system 100, in accordance with some embodiments of the present disclosure. In some embodiments, system 100 implements automatic and temporary application download and installation operations from a website and further performs an application uninstall operation from a user device. The application is a program for a smartphone, desktop, tablet or other suitable types of devices.

In FIG. 1, system 100 is shown to include user device 104 and communication network 108, in accordance with some embodiments of the disclosure. User device 104 is shown to receive user data 102, which generally includes data related to user activity. For example, user data 102 may be data corresponding to one or more user accounts, user interests, user activities, or a combination thereof. In some embodiments, system 100 receives user data 102 from one or more user social media accounts, user email accounts or user text accounts, and in this connection, user data may be social media data, email data or text data, respectively. User data 102 is not limited to email, text, and social media data and may include calendar data or any other suitable user activity- or interest-related data. Social media data may be data generated by user social media activity of a user social media account, such as a Twitter, LinkedIn, or Facebook account. Nonlimiting examples of social media data include data that may correspond to a picture that a user may post of a recent trip to Disneyland on Facebook or a link to an e-learning website to learn a foreign language that the user shares with colleagues on LinkedIn. Nonlimiting examples of email data include data that may correspond to an email message a user sends to or receives from a friend or a colleague to schedule a meeting or an email with attached photographs of a recent or a destination trip. Nonlimiting examples of text data include a text message of a ride-sharing arrangement confirmation.

User device 104 may be a computing device suitably configurable to receive user data, process the user data, and communicate with communication network 108 regarding the user data. In some embodiments, user device 104 may be a mobile device, a desktop computer, a laptop, a tablet, or a network device such as a server, as discussed in further detail relative to FIG. 7.

User device 104 may implement at least some of the functions disclosed herein with hardware, software, or a combination of hardware and software. In some embodiments, for example, user device 104 is configured to execute program code stored in memory to facilitate processing of user data 102, as disclosed herein. User device 104 may include an application, such as an application 708 (FIG. 7) with or that operates with an application program processor implementing some of the processes and methods disclosed herein as a stand-alone application.

Communication network 108 may include one or more cloud-based networks made of network devices. For example, communication network 108 may include a local area network (LAN) or a wide area network (WAN) including a server that carries out, in part or in whole, the functions performed by user device 104, as disclosed herein. Communication network 108 may include one or more network devices hosting one or more websites. For example, communication network 108 may include one or more servers that host airline, ridesharing, e-learning, or train schedule websites.

In an example operation of system 100, user device 104 downloads an application program from a predicted website, resident at communication network 108, with a feature set that corresponds to an anticipated user activity. Initially, user device 104 identifies the anticipated user activity based on user data 102, which corresponds to future (predicted) activities of the user. For example, user data 102 may include data from a user online or application-based calendar system suggesting a future airline trip. In the example of FIG. 1, user device 104 identifies an airline website 128, for example, the Fabulous Airline website. User device 104 identifies the Fabulous Airline website based on a correspondence between the anticipated user activity, airline travel, and website 128. With continued reference to the above example, user device 104 parses the incoming user data 102 to generate user calendar data corresponding to the calendared air trip with Fabulous Airline on Memorial Day to Disneyland. User device 104 locates the corresponding Fabulous Airline website, website 128, based on the calendared data (the user's predicted future air travel). User device 104 may wait for a time closer to the trip on Memorial Day, a few hours prior, perhaps, to download a corresponding in-flight entertainment application program (application program 118), Fabulous Airline entertainment application program, from the Fabulous Airline website, onto user device 104. Fabulous Airline entertainment application program facilitates user media asset consumption during the user air travel with Fabulous Airline to Disneyland on Memorial Day. That is, the installed Fabulous Airline entertainment application program, when executed by user device 104 during the user flight, enables the user to, for example, watch a Netflix movie on the flight.

User device 104 knows that the application program is associated with an airline flight because user device 104 retrieves the application from the corresponding airline website. User device 104 determines the website of interest based on user-associated context. User device 104 knows to wait until shortly before the flight to download the application program based on various contextual factors. An in-flight entertainment application is typically an unrequired travel item until close to the time of the trip. Recognition of airline travel helps to download an airline-related application program. Waiting to download the application until shortly before the flight avoids unnecessary user interface display clutter and burdensome user management.

Website 128 provides a feature set that corresponds to the anticipated user activity (e.g., air travel schedule) and a downloadable application program 118 (e.g., the Fabulous Airline application program) accessible at website 128. User device 104 retrieves and installs downloadable application program 118 on user device 104 as shown by a user device 104' drawn with a dashed outline (in FIG. 1). In another example, user data 102 may include data from a user email or text message suggesting a trip requiring airline travel.

In some embodiments, user device 104 may identify, download, and install more than one website based on an anticipated user activity. For example, user device 104 may predict that the user is interested in booking an airline trip to Disneyland based on a user social media post. User device 104 may further predict the user is interested in booking a hotel reservation while at Disneyland based on a search for surrounding hotels using a Google search account.

Upon downloading and installing application program 118 on user device 104, in response to detecting absence of user interaction with application program 118 at user device 104' within a preset period of time, user device 104' may automatically uninstall the downloadable application program from user device 104'. The predefined wait period may be adjustable based on the website content. For example, an airline website might suggest a longer wait time than a word editing website because ticket reservations is generally a lengthier activity than checking a document for grammar mistakes.

In some embodiments, user device 104' uninstalls application program 118 in response to a user interaction with user device 104' or a user reaction instead of in response to a predefined time period. For example, in response to detecting a user input corresponding to a user action to close application program 118, user device 104' may uninstall application program 118 or in response to detection of a voice command to close application program, user device 104' may uninstall application program 118. In some embodiments, user device 104' may uninstall application program 118 based on sensor input. Sensor input may include input from a user reaction, such as a user facial reaction or a user screen swipe gesture suggesting the user is done using application program 118.

User device 104 matches website 128 with an anticipated user activity based on a feature set accessible at the website. With continued reference to the above airline example, website 128 may include Fabulous Airline flight schedules and pricing feature set.

Figure 2:
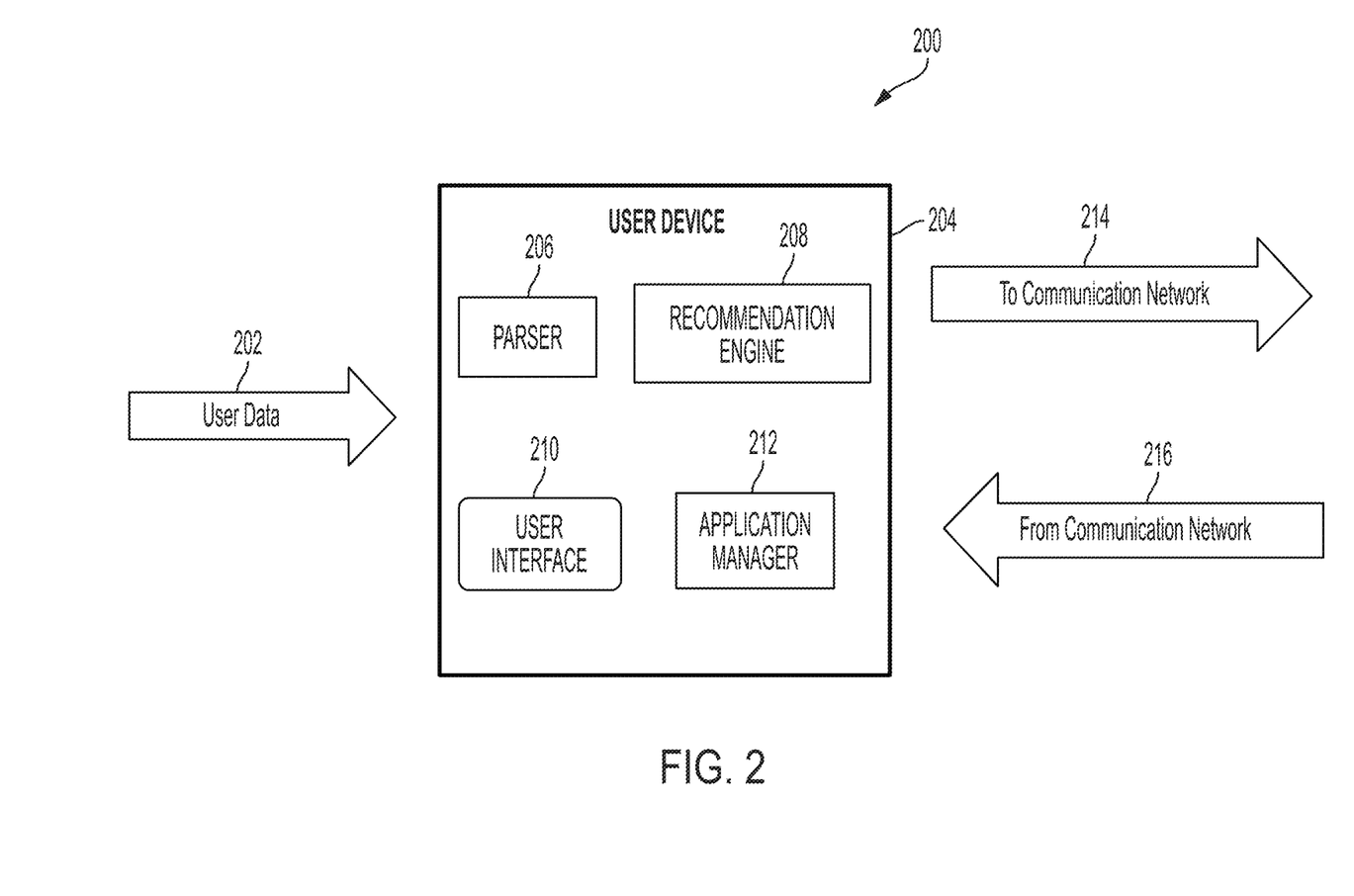

FIG. 2 shows an illustrative block diagram of an automatic application retrieval system 200, in accordance with some embodiments of the present disclosure. System 200 is shown to include a user device 204. User device 204 may but need not be configured as user device 104 (FIG. 1). In some embodiments, user device 200 includes a parser 206, a recommendation engine 208, a user interface 210, and an application manager 212. User device 204 receives user data 202 and generates an anticipated user activity data 214 corresponding to an anticipated user activity and transmits the generated anticipated user activity data 214 to a communication network. User device 204 may generate and provide user activity data 214 to a communication network such as communication network 108 of system 100. User device 204 further receives application program data 216 from the communication network to which user device 204 transmits user activity data 214. Application program data 216 represents an application program downloaded from a predicted site in a communication network. For example, user device 204 may receive user data 202 that corresponds to air travel, as described relative to the example of FIG. 1. User device 204 may generate user activity data 214 corresponding to airline travel to a communication network and in response, may receive application program data 216 corresponding to the Fabulous Airline application found at website 118 (in FIG. 1). In this sense, user device 204 (or any of the user devices shown and discussed herein) is a predictor of future user activities, the activities the user is expected or predicted to participate in, in the near future, based on past or current user activity as represented by user data 202.

In some embodiments, parser 206 scans user data 202 for predicted (or anticipated) user activity. For example, parser 206 may scan email data, social media data, and text data for relevant user activity. Parser 206 may be taught to parse user data 202 based on a machine learning technique facilitated by a trained machine learning model. The model may be trained based on certain activity features such as, without limitation, travel, sports activities, and entertainment.

Figure 3:
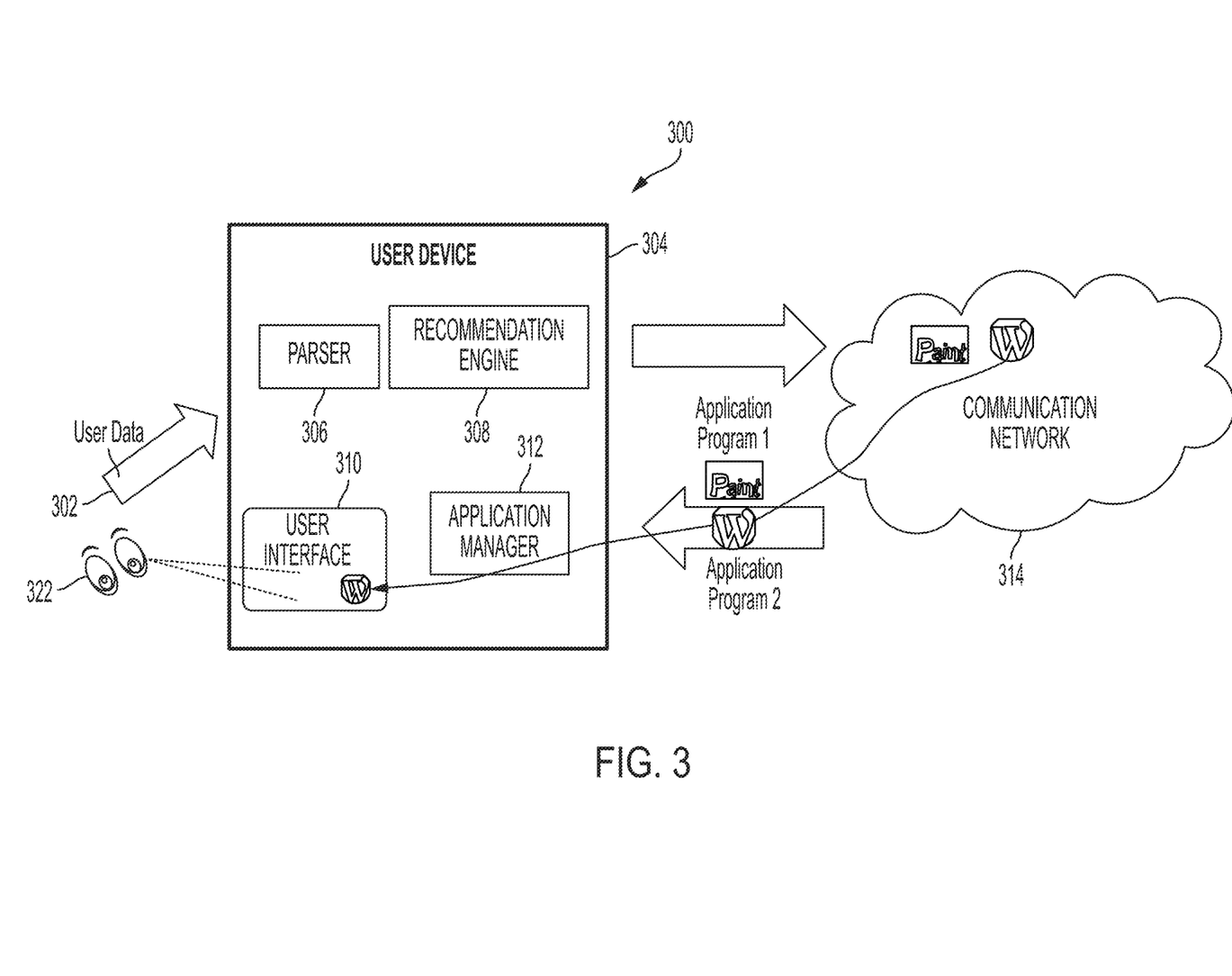

In some embodiments, parser 206 scans user data 202 for a match with entities of a content database, as shown and discussed relative to FIG. 3. In response to finding a match between user data 202 and one or more content entities, recommendation engine 208 scours websites of a communication network, such as communication network 108, to perform a website match. Recommendation engine 208 performs a website prediction by searching for a match between the anticipated user activity, found by parser 206 and represented by user activity data 214, and content entities. Recommendation engine 208 may implement the search in accordance with a variety of techniques to predict one or more websites corresponding to the content entities. In an example embodiment, recommendation engine 208 performs a natural language processing search, an attempt at matching strings of text or phrases.

Recommendation engine 208 may narrow the search for a predicted website corresponding to an anticipated user activity by implementing yet another search for a match between the website search result and one or more user preferences from a user preference database. In some embodiments, user preferences include preferences from user email data, text data or social media data. For example, a user gender from a user Facebook account may help narrow a search for outdoor apparel on a department store website. In response to a match between the website search result and a user preference or in response to a match between the website search result and one or more content entities, as the case may be, application manager 212 receives application program data 216 representing an application program retrieved from the predicted website.

Application manager 212 automatically downloads and installs the retrieved application program to a memory location local or remote to user device 204. In an embodiment, application manager 212 may download the application program to a storage 608 in FIG. 6. The process of predicting a website and downloading and installing an application program from the predicted website onto user device 204 is performed by user device 204 automatically and without user intervention, to enhance the user's experience. With continued reference to the Fabulous Airline example above, the application program is automatically identified, downloaded, and installed for the user just before the user's flight, without any user involvement or application management. The Fabulous Airline application program is uninstalled after the flight, again, automatically and with no requisite user action. The system avoids any application management by the user.

User device 204 executes the application program corresponding to application program data 216, and user interface 210 generates a display of the application program features to the user. For example, user interface 210 may generate an airline schedule display for the user upon completion of download and installation of application program 118 (FIG. 1) in the case where application program 118 is an in-flight entertainment application. In some embodiments, application program 118 is afforded a more complete feature set relative to its corresponding website 128. For example, application program 118 may provide real-time access to the airline schedule of Fabulous Airline, whereas website 128 may provide an out-of-date Fabulous Airline schedule.

In some embodiments, user device 204 may predict a website not necessarily in line with the user's future activities. In other words, user device 204 may simply guess an incorrect website, a website essentially useless to the user. In such a case, user device 204 may detect an undesirable website prediction and uninstall the downloaded application program. User device 204 may perform detection of an undesirable web site in response to a user input, user reaction, or absence of the use of the downloaded application program for a predefined period of time. FIG. 3 serves as an example embodiment of a wrong website predictor.

FIG. 3 shows an illustrative block diagram of an automatic application retrieval system 300, in accordance with some embodiments of the present disclosure. In some embodiments, an automatic application retrieval system 300 is configured to operate in a manner analogous to system 100 of FIG. 1 or system 200 of FIG. 2. In some embodiments, system 300 may function differently, in part or in whole, from system 100 or system 200.

System 300 is shown to include user device 304 communicatively coupled to communication network 314, in accordance with an embodiment of the invention. User device 304 is shown to include a parser 306, a recommendation engine 308, a user interface 310 and an application manager 312. In system 300, user device 304 receives user data 302, parser 306 scans user data 302 and identifies an anticipated user activity based on the scan, and user device 304 provides data representing the anticipated user activity (user activity data) to communication network 314. Recommendation engine 308 searches websites of communication network 314 for a website with a feature set corresponding to the anticipated user activity and finds a website at communication network 314 with an accessible application, Application Program 1. Application manager 312 downloads and installs Application Program 1 on user device 304. For example, based on user data 302, user device 304 may predict a music website and may download a corresponding music application program. User interface 310 may then generate, for display, features of the music application program as the music application program executes on user device 304.

In some embodiments, user device 304 may process audio signals, a song, by executing the music application program. User device 304 may be prompted to uninstall the music application program due to an incorrect prediction. For example, the user may signal by audio command, physical gesture, or a program close action that the downloaded music application program is uninteresting. User 322 may indicate the wrong predicted website by an audio input such as speaking the words "close program" to a microphone of user device 304. User device 304, in response to detecting the user's disinterested reaction to the music application program, may embark on another hunt for the website of interest to user 322 and, to this end, may this time download, install and execute another application program, Application Program 2, automatically and without the user's intervention, from a corresponding website at communication network 314.

In a second attempt at finding a correct website, in some embodiments, parser 306 may scan user data 302 once again, searching for another anticipated user activity. Parser 306 may scan the user data saved in a local or remotely located memory location by user device 304 when user data 302 is initially received. Alternatively, parser 306 may scan real-time user data 302 having the benefit of the most current user interests. In the example of FIG. 3, parser 306 scans real-time user data to find an anticipated user activity corresponding to a word processing editor, such as Application Program 2, from a spell checker website, as identified by recommendation engine 308. Application manager 312 downloads and installs Application Program 2 automatically and without user intervention. User interface 310 generates a spell checker display from the Application Program 2 feature set for user 322.

In any of systems 100, 200, and 300, the user device may search for an application program with restricted access rights, as previously discussed. In response to finding an application program with restricted access rights, the user device may search to find one or more alternate websites matching an anticipated user activity or may be configured to stop searching altogether.

Figure 4:
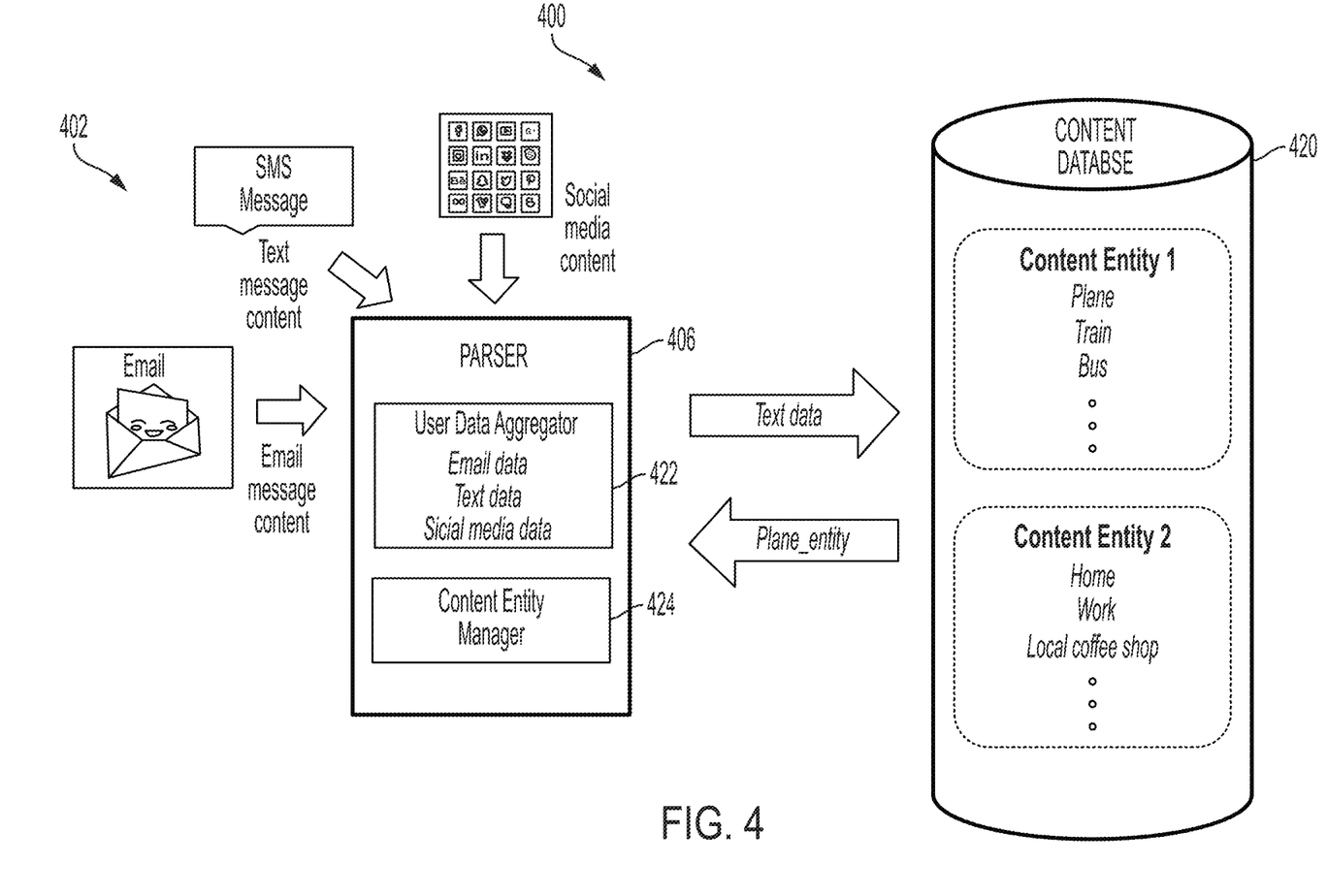

FIG. 4 shows an illustrative block diagram of an automatic application retrieval system 400, in accordance with some embodiments of the present disclosure. System 400 is shown to include parser 406 receiving user data 402 made of user email, text, and/or social media data. While not shown in FIG. 4, parser 406 is part of a user device, similar to user devices 104, 204, and 304 of FIGS. 1, 2, and 3, respectively, that is communicatively coupled to content database 420. Parser 406 is shown to include a user data aggregator 422 and a content entity manager 424. User data aggregator 422 collects data from various user data sources. For example, as user data 402 is received, user data aggregator 422 may save the received user data 402 in a local or remotely located memory or storage location. In some embodiments, user data aggregator 422 saves aggregated user data in storage 608 of FIG. 6. In some embodiments, user data aggregator 422 formats and processes the various types of user data, such as email, text and social media data, into a single formatted file to accommodate searching operations.

Content entity manager 424 searches the content entities of content database 420 for a match with the aggregated user data from user data aggregator 422 to identify an anticipated user activity. For example, content entity manager 424 may search Content Entities 1 and 2 for a transportation content entity corresponding to a user text data. A text with the phrase "airline" or "plane" may be matched with a content entity from Content Entity 1 or a text with the phrase "locations," or a distance suggesting a location distance may be matched with an entity of Content Entity 2, for example.

Figure 5A:
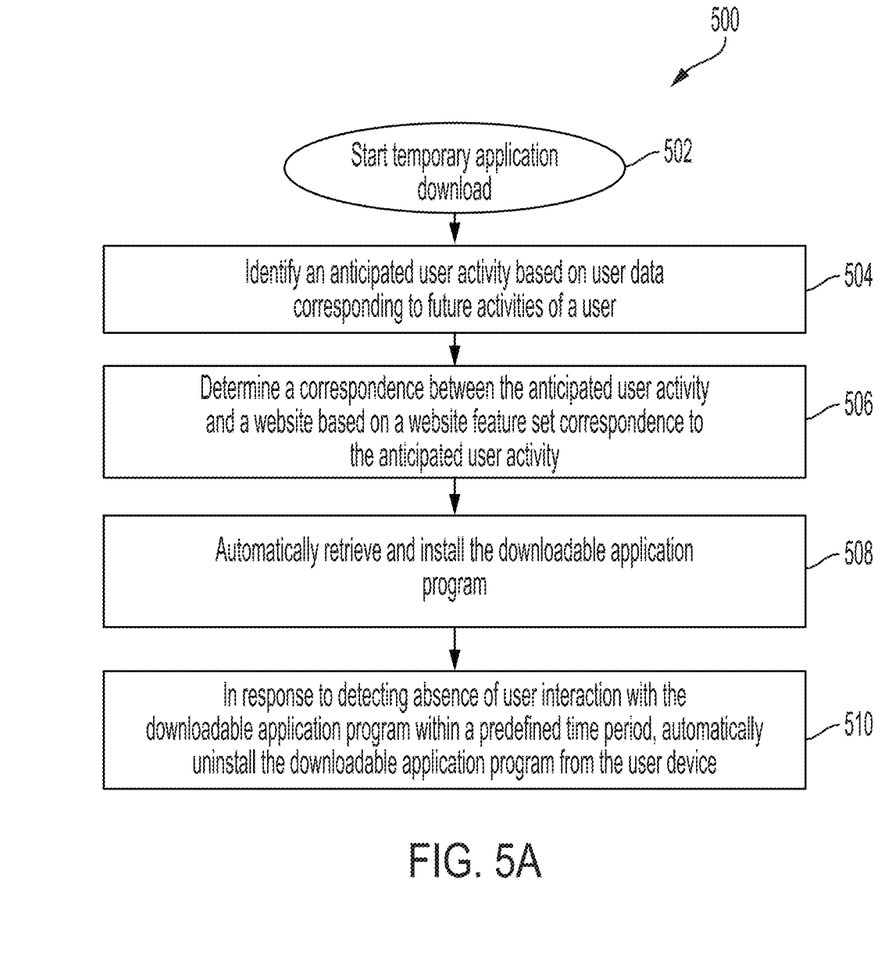
FIG. 5A depicts an illustrative flowchart of an automatic application program retrieval process, in accordance with some embodiments of the disclosure.

FIG. 5A depicts an illustrative flowchart of an automatic application program retrieval process 500 in accordance with some disclosures. Process 500 may be implemented by a user device of any of the systems 100-400 and is described below relative to the user devices of FIGS. 1-4. In some embodiments, process 500 is performed by a user device not shown and discussed herein suitable to successfully perform the steps of FIG. 5A. For the purpose of illustration, system 200 of FIG. 2 is referenced in the below discussion of the steps of process 500 and user device 204 is presumed to carry out the process 500 steps.

Process 500 is shown in FIG. 5A to start at 502 and proceeds to identify an anticipated user activity based on user data corresponding to future activities of the user, at step 504. In an example embodiment, parser 206 may perform the foregoing identification. At step 506, recommendation engine 208 scours the websites of a communication network to determine a correspondence between the anticipated user activity of step 504 and a web site with a feature set corresponding to the anticipated user activity. In some embodiments, determining a correspondence between the anticipated user activity and the website is based on prior user access to the website. A prior user access to the website may be tracked by a user device using cookies.

In response to finding the website, recommendation engine 208 or 308 may scan the website for a hyperlink to a downloadable application program. In some embodiments, the recommendation engine employs a search technique to identify the application program hyperlink. The recommendation engine may find the link by performing a natural language recognition search for a common text string, for example. In this respect, recommendation engine 208 or 308 may search for the phrase "Downloadable Link" or simply the term "Download." In some embodiments, the recommendation engine may alternatively or additionally employ one or both of a natural language processing technique and a web crawling technique to check for restrictions indicated on the website for downloading the application program. In example embodiments, natural language recognition processes may be implemented with speech recognition algorithms such as hidden Markov model, dynamic time warping, and artificial neural networks. In example embodiments, a web crawling technique may be implemented with a crawling algorithm such as On-line Page Importance Computation (OPIC). Other types of natural language processing and web crawling algorithms are contemplated.

In the case of detecting a restriction on the website or detecting the absence of an application program on the website, the recommendation engine may make an attempt to find an alternate match with the anticipated user activity on a different website. In some embodiments, the recommendation engine may find more than one website and may rank the websites by order of priority. For example, the websites may be ranked based on the number of words or strings matching an anticipated user activity or based on the number of times the websites were previously accessed by a common user based on one or more common content entities.

At step 508 of process 500, application manager 212 or 312 automatically retrieves and installs the downloadable application program from the website identified at step 506. Once installation of the program is complete, at step 510, in response to detecting a configurable predefined time period of the absence of user interaction with the downloaded application program, application manager 212 or 312 may automatically uninstall the downloadable application program thereby removing clutter from the user device display for an improved user experience. In the above manner, finding, downloading, installing and uninstalling an application relevant to the foreseeable user activities are performed automatically without hassle to the user.

Figure 5B:
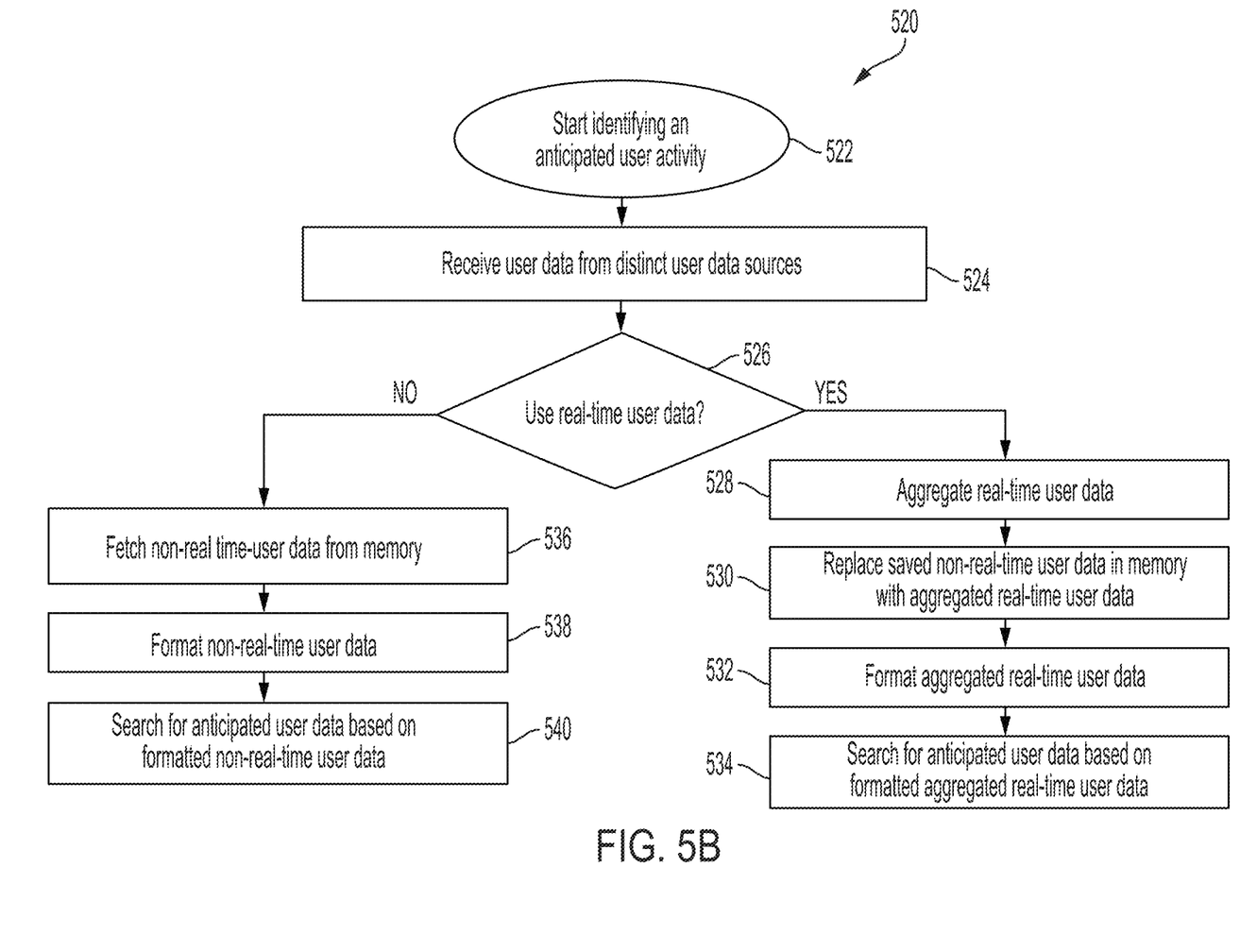
FIG. 5B depicts an illustrative flowchart of an anticipated user activity identification process, in accordance with some embodiments of the disclosure.

FIG. 5B depicts an illustrative flowchart of an anticipated user activity identification process 520, in accordance with some disclosures. In some embodiments, FIG. 5B shows further details of the steps a user device of various disclosed embodiments performs to carry out step 504 of FIG. 5A. Process 520 may be implemented by user device 104, user device 204, user device 304 or user device 404. In some embodiments, process 520 is performed by a user device not shown and discussed herein suitable to successfully perform the steps of FIG. 5B. For the purpose of illustration, system 200 of FIG. 2 is referenced in the below discussion of the steps of process 520 and user device 204 is presumed to carry out the process 520 steps.

User device 204 may receive user data 202 from a single source, such as a user email account or a user calendar account, or a combination of sources. For the purpose of discussion, user data 202 is presumed as shown in FIG. 2. With reference to FIG. 5B, after step 524, at step 526, user device 204 makes a determination to process the current user data 202 received in real-time or non-real-time user data previously saved in storage. For example, user data may be saved in local or remotely accessible memory relative to user device 204. In some embodiments, user data may be saved in storage 608 of FIG. 6.

Figure 6:
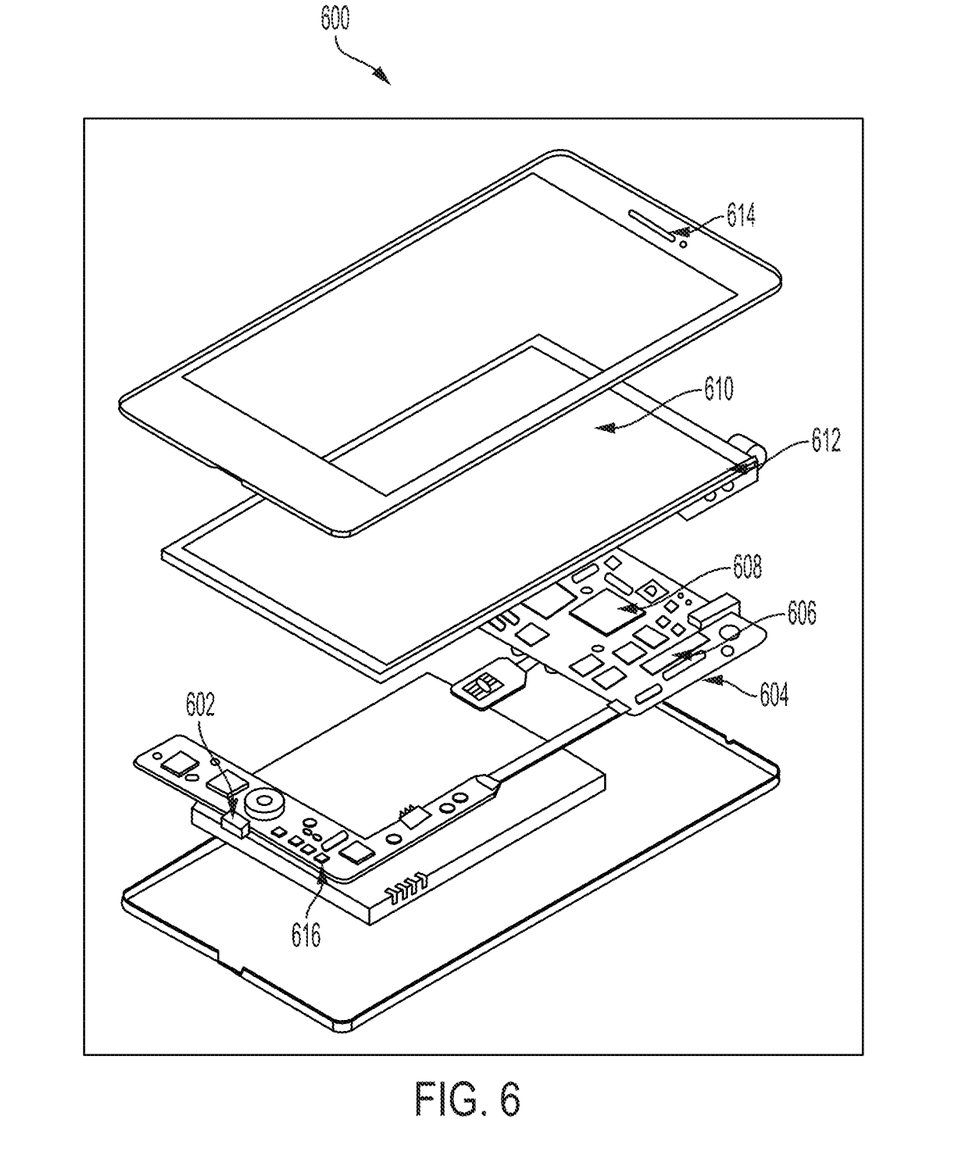
FIG. 6 is a block diagram of an illustrative user device, in accordance with some embodiments of the present disclosure.

In response to a determination to use real-time user data 202 at step 526, process 520 executes step 528, and in response to a determination to use non-real-time user data 202 at step 526, process 520 executes step 536. At step 528, user data received from the various user data sources is aggregated. In some embodiments, parser 206 aggregates the user data at step 528 as previously discussed. Next, at step 530, the non-real-time user data previously saved in memory during a previous execution of process 520 is replaced with the aggregated real-time user data of step 528. For example, non-real-time user data saved in storage 608 may be replaced by the aggregated real-time user data 202 of step 528. Next, at step 532, the aggregated user data of step 530 is processed to facilitate a common formatting of the aggregated user data, as previously discussed. At step 534 of process 520, user device 204 searches for an anticipated user data based on the formatted aggregated user data of step 534. Parser 206 of FIG. 2 may perform searching for an anticipated user data at step 534. The process comes to an end after step 534; alternatively, process 520 resumes at step 524 to process the next user data from the various user data sources.

User device 204 performs steps 536-540 of process 520 when identifying an anticipated user activity based on past or non-real-time user data. At step 536, user device 204 fetches the non-real-time user data from memory, formats the fetched user data at step 538 to construct a uniform formatted user data sequence and, at step 540, searches the formatted non-real-time user data of step 538 for an anticipated user data. As noted in previous discussions, in some embodiments, search for an anticipated user data may be performed at either or both of steps 534 and 540 based on various search techniques. In some embodiments, user device 204 performs a natural language string search to find a match between the user data and an identifiable user activity or interest. An identifiable user activity or interest may be based on real-time events such as a scheduled trip, as previously explained.

Figure 5C:
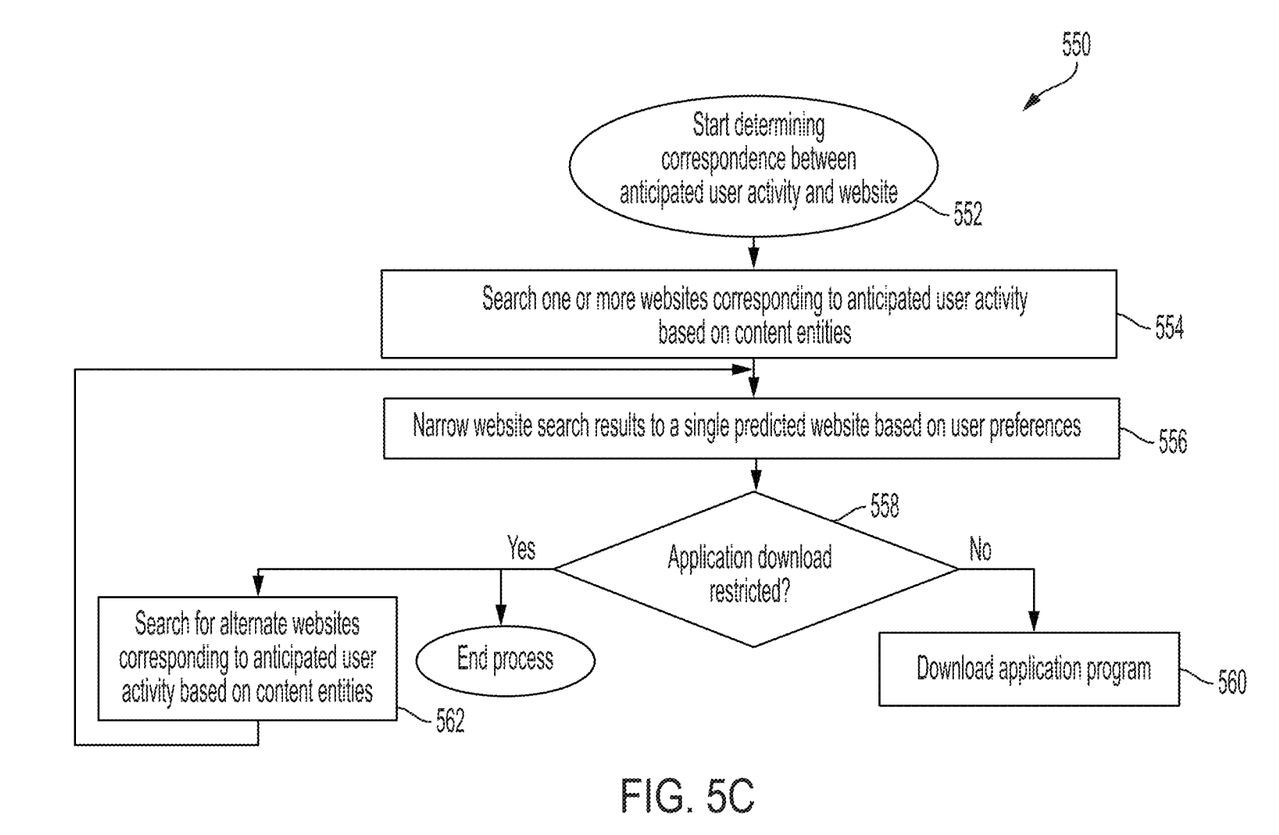
FIG. 5C depicts an illustrative flowchart of a website search and identification process, in accordance with some embodiments of the disclosure.

FIG. 5C depicts an illustrative flowchart of a website search and identification process 550, in accordance with some embodiments of the disclosure. In some embodiments, FIG. 5C shows further details of the steps a user device of various disclosed embodiments performs to carry out step 506 of FIG. 5A. Process 550 may be implemented by user device 104, user device 204, user device 304 or user device 404. In some embodiments, process 550 is performed by a user device not shown and discussed herein suitable to successfully perform the steps of FIG. 5C. For the purpose of illustration, system 200 of FIG. 2 is referenced in the below discussion of the steps of process 550 and user device 204 is presumed to carry out the process 550 steps.

Website search and identification process 550 begins at 502. Next, at step 554, user device 204 performs a search of one or more websites corresponding to a previously identified anticipated user activity based on content entities and a cataloged collection of user-associated attributes, such as discussed with reference to FIG. 4. As earlier noted, optionally, at step 556, user device 204 performs further search of the website results of step 554, this time based on user preferences from various user accounts, and process 550 continues to step 558. In some embodiments, steps 554 and 556 are performed by recommendation engine 208 of user device 204. In some embodiments, at either step 554 or step 556, user device 204 may find a user activity- or interest-based website using tracking cookies. That is, tracking cookies are inspected to identify a history of user-accessed websites and, based on the identified user-accessed websites and optionally in addition to a natural language search, the website(s) of interest are located. As commonly known, a website may be identified by a hyperlink, and hyperlinks may be tracked by cookies.

At step 558, user device 204 searches for an application download restriction message at the website determined at step 556 or step 554, as the case may be. In some embodiments, user device 204 searches for an application download restriction message, at step 558, using a natural language search. In the absence of detecting an application download restriction indicator at step 558, process 550 continues to step 560 and the application program corresponding to the website found at steps 554 or 556 is downloaded onto the user device 204. In the presence of a restriction notification—identification of the notification at step 558—process 550 either ends or continues to step 562 to search for an alternate website, one without a download restriction. Upon detecting an alternate website (or more than one), process 550 resumes, starting from step 556, to process the next anticipated user activity.

The order of steps of each of the processes 500, 520 and 550, as shown in the flow charts of FIGS. 5A, 5B, and 5C, respectively, may be changed or exchanged, as may be suitable. One or more steps, as may be suitable, can be added or deleted to each of the processes 500, 520 and 550.

A user may access content, an application program, and other features from one or more of their (user) devices (i.e., user equipment). FIG. 6 shows generalized embodiments of an illustrative user device. Although illustrated as a mobile user device (e.g., a smartphone), user device 600 may include any user electronic device with which a user automatically retrieves an application program from a predicted website, as disclosed herein. For example, user device 600 may include a desktop computer, a tablet, a laptop, a remote server, any other suitable device, or any combination thereof, for automatic application program retrieval, as described above, or accessing content, such as, without limitation, wearable devices with projected image reflection capability, such as a head-mounted display (HMD) (e.g., optical head-mounted display (OHMD)), electronic devices with computer vision features (such as augmented reality (AR), virtual reality (VR), extended reality (ER, or mixed reality (MR)), portable hub computing packs, a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smartphone, or any other television equipment, computing equipment, or wireless device, and/or combination of the same. In some embodiments, the user device may have a front-facing screen and a rear-facing screen, multiple front screens, or multiple angled screens. In some embodiments, the user device may have a front-facing camera and/or a rear-facing camera. On these user devices, users may be able to navigate among and locate the same content available through a television. Consequently, a user interface in accordance with the present disclosure may be available on these devices, as well. The user interface may be for content available only through a television, for content available only through one or more of other types of user devices, or for content available through both a television and one or more of the other types of user devices. The user interfaces described herein may be provided as online applications (i.e., provided on a website), or as stand-alone applications or clients on user equipment devices. Various devices and platforms that may implement the present disclosure are described in more detail below.

In some embodiments, display 612 may include a touchscreen, a television display or a computer display. In a practical example, display 612 may display the application program icon of an application program downloaded using some of the disclosed methods and embodiments. In some embodiments, the one or more circuit boards illustrated include processing circuitry, control circuitry, and storage (e.g., RAM, ROM, Hard Disk, Removable Disk, etc.). In some embodiments, the processing circuit, control circuitry, or a combination thereof may implement one or more of the processes of FIGS. 5A-5C. In some embodiments, the processing circuitry, control circuitry, or a combination thereof may implement one or more functions or components of the user devices of FIGS. 1-4. For example, each or a combination of parser 206, recommendation engine 208, application manager 212 and user interface 210 of user device 202 (FIG. 2) may be implemented by the processing circuitry, control circuitry or a combination of the processing circuitry and control circuitry.

In some embodiments, circuit boards include an input/output path. User device 600 may receive content and data via input/output (hereinafter "I/O") path 602. I/O path 602 may provide content and data to control circuitry 604, which includes processing circuitry 606 and storage 608. Control circuitry 604 may be used to send and receive commands, requests, and other suitable data using I/O path 602. I/O path 602 may connect control circuitry 604 (and specifically processing circuitry 606) to one or more communications paths (described below). I/O functions may be provided by one or more of these communications paths but are shown as a single path in FIG. 6 to avoid overcomplicating the drawing.

Control circuitry 604 may be based on any suitable processing circuitry such as processing circuitry 606. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry is distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 604 executes instructions for an application stored in memory (e.g., storage 608). Specifically, control circuitry 604 may be instructed by the application to perform the functions discussed above and below. For example, the application may provide instructions to control circuitry 604 to generate media guidance displays. In some implementations, any action performed by control circuitry 604 may be based on instructions received from the application.

In some client/server-based embodiments, control circuitry 604 includes communications circuitry suitable for communicating with an application server or other networks or servers. The instructions for carrying out the above-mentioned functionality may be stored on the application server. Communications circuitry may include a cable modem, an integrated-services digital network (ISDN) modem, a digital subscriber line (DSL) modem, a telephone modem, an ethernet card, or a wireless modem for communications with other equipment, or any other suitable communications circuitry. Such communications may involve the Internet or any other suitable communication networks or paths. In addition, communications circuitry may include circuitry that enables peer-to-peer communication of user equipment devices, or communication of user equipment devices in locations remote from each other (described in more detail below).

Memory may be an electronic storage device provided as storage 608 that is part of control circuitry 604. As referred to herein, the phrase "electronic storage device" or "storage device" or "memory" should be understood to mean any device for storing electronic data, computer software, or firmware, such as random-access memory, read-only memory, hard drives, optical drives, solid state devices, quantum storage devices, gaming consoles, gaming media, or any other suitable fixed or removable storage devices, and/or any combination of the same. Storage 608 may be used to store various types of content described herein as well as media guidance data described above. Nonvolatile memory may also be used (e.g., to launch a boot-up routine and other instructions). Cloud-based storage, for example, may be used to supplement storage 608 or instead of storage 608.

In some embodiments, display 612 is caused by generation of a display by one of user interfaces 210 and 310 of FIGS. 2 and 3, respectively. A user may send instructions to control circuitry 604 using user input interface 610. User input interface 610, display 612, or both may include a touchscreen configured to provide a display and receive haptic input. For example, the touchscreen may be configured to receive haptic input from a finger, a stylus, or both. In some embodiments, equipment device 600 may include a front-facing screen and a rear-facing screen, multiple front screens, or multiple angled screens. In some embodiments, user input interface 610 includes a remote-control device having one or more microphones, buttons, keypads, any other components configured to receive user input or combinations thereof. For example, user input interface 610 may include a handheld remote-control device having an alpha-numeric keypad and option buttons.

Audio equipment 614 may be provided as integrated with other elements of user device 600 or may be stand-alone units. The audio component of videos and other content displayed on display 612 may be played through speakers of audio equipment 614. In some embodiments, the audio may be distributed to a receiver (not shown), which processes and outputs the audio via speakers of audio equipment 614. In some embodiments, for example, control circuitry 604 is configured to provide audio cues to a user, or other audio feedback to a user, using speakers of audio equipment 614. Audio equipment 614 may include a microphone configured to receive audio input such as voice commands or speech. For example, a user may speak letters or words that are received by the microphone and converted to text by control circuitry 604. In a further example, a user may voice commands that are received by the microphone and recognized by control circuitry 604.

An application (e.g., for retrieving and installing and uninstalling a program, a display, or both) may be implemented using any suitable architecture. For example, a stand-alone application may be wholly implemented on user device 600. In some such embodiments, instructions for the application are stored locally (e.g., in storage 608), and data for use by the application is downloaded on a periodic basis (e.g., from an out-of-band feed, from an Internet resource, or using another suitable approach). Control circuitry 604 may retrieve instructions of the application from storage 608 and process the instructions to generate any of the displays discussed herein. Based on the processed instructions, control circuitry 604 may determine what action to perform when input is received from input interface 610. For example, movement of a cursor on a display up/down may be indicated by the processed instructions when input interface 610 indicates that an up/down button was selected. An application and/or any instructions for performing any of the embodiments discussed herein may be encoded on computer-readable media. Computer-readable media includes any media capable of storing data. The computer-readable media may be transitory, including, but not limited to, propagating electrical or electromagnetic signals, or it may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

In some embodiments, the application is a client/server-based application. Data for use by a thick or thin client implemented on user device 600 is retrieved on demand by issuing requests to a server remote from user device 600. For example, the remote server may store the instructions for the application in a storage device. The remote server may process the stored instructions using circuitry (e.g., control circuitry 604) and generate the displays discussed above and below. The client device may receive the displays generated by the remote server and may display the content of the displays locally on user device 600. This way, the processing of the instructions is performed remotely by the server while the resulting displays (e.g., which may include text, a keyboard, or other visuals) are provided locally on user device 600. User device 600 may receive inputs from the user via input interface 610 and transmit those inputs to the remote server for processing and generating the corresponding displays. For example, user device 600 may transmit a communication to the remote server indicating that an up/down button was selected via input interface 610. The remote server may process instructions in accordance with that input and generate a display of the application corresponding to the input (e.g., a display that moves a cursor up/down). The generated display is then transmitted to user device 600 for presentation to the user.

In some embodiments, the application is downloaded and interpreted or otherwise run by an interpreter or virtual machine (e.g., run by control circuitry 604). In some embodiments, the application may be encoded in the ETV Binary Interchange Format (EBIF), received by control circuitry 604 as part of a suitable feed, and interpreted by a user agent running on control circuitry 604. For example, the application may be an EBIF application. In some embodiments, the application may be defined by a series of JAVA-based files that are received and run by a local virtual machine or other suitable middleware executed by control circuitry 604.

Figure 7:
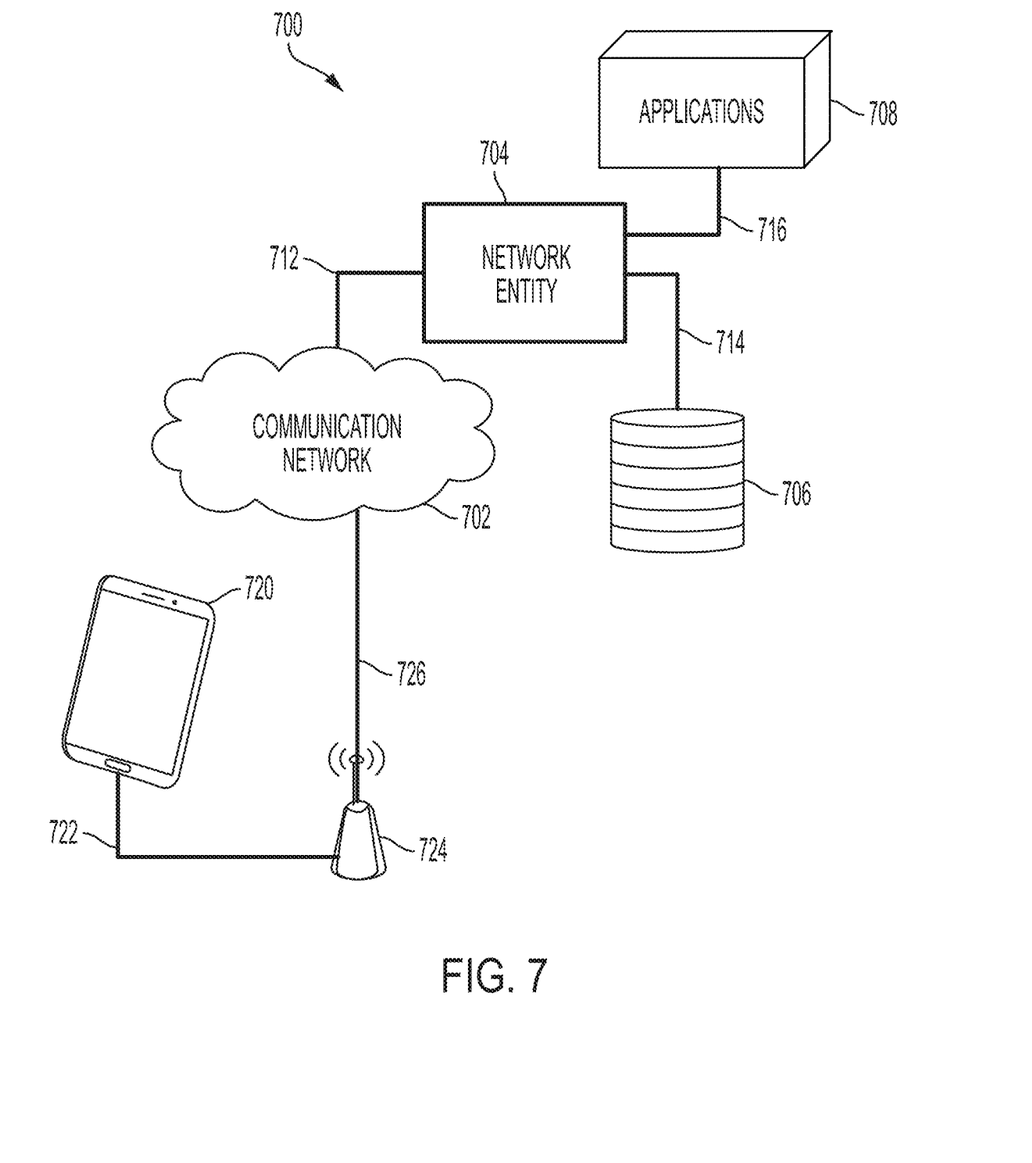
FIG. 7 is a block diagram of an illustrative system for transmitting information, in accordance with some embodiments of the present disclosure.

FIG. 7 is a block diagram of illustrative system 700 for transmitting messages, in accordance with some embodiments of the present disclosure. In system 700, there may be more than one of each type of user device, but only one of each is shown in FIG. 7 to avoid overcomplicating the drawing. In addition, each user may utilize more than one type of user device and also more than one of each type of user device.

User device 720 illustrate as a wireless-enabled device, may be coupled to communication network 702 (e.g., the Internet). For example, user device 720 is coupled to communication network 702 via communications path 722 to access point 724 and wired connection 726. User device 720 may also include wired connections to a LAN, or any other suitable communications link to network 702. Communication network 702 may be one or more networks including the Internet, a mobile phone network, mobile voice or data network (e.g., a WIFI, WiMAX, GSM, UTMS, CDMA, TDMA, 3G, 4G, 5G, Li-Fi, LTE network), cable network, public switched telephone network, or other types of communications network or combinations of communications networks. Path 712 may include one or more communications paths, such as a satellite path, a fiber-optic path, a cable path, a path that supports Internet communications, a free-space connection (e.g., for broadcast or other wireless signals), or any other suitable wired or wireless communications path or combination of such paths.

System 700 includes network entity 704 (e.g., a server or other suitable computing device) coupled to communications network 702 via communications path 712. Communications with network entity 704 may be exchanged over one or more communications paths but are shown as a single path in FIG. 7 to avoid overcomplicating the drawing. Network entity 704 is configured to access database 706 or applications 708 (e.g., an applications database or host server) via communications links 714 and 716, respectively. Although shown as a separate device, network entity 704 may include database 706 and applications 708 (e.g., stored in memory). In addition, there may be more than one of each of database 706 and applications 708, but only one of each is shown in FIG. 7 to avoid overcomplicating the drawing. In some embodiments, database 706 and applications 708 may be integrated as one source device (e.g., that may be, but need not be, network entity 704).

Database 706 may include one or more types of stored information, including, for example, relationship information, a relationship entity database, recipient information, historical communications records, user preferences, user profile information, a template database, any other suitable information, or any combination thereof. Applications 708 may include an applications-hosting database or server, plug-ins, a software developers kit (SDK), an applications programming interface (API), or other software tools configured to provide software (e.g., as downloaded to a user device), run software remotely (e.g., hosting applications accessed by user devices), or otherwise provide applications support to applications of user device 720. In some embodiments, information from network entity 704, database 706, applications 708, or a combination thereof may be provided to a user device using a client/server approach. For example, user device 720 may pull information from a server, or a server may push information to user device 720. In some embodiments, an application client residing on user device 720 may initiate sessions with database 706, applications 708, network entity 704, or a combination thereof to obtain information when needed (e.g., when data is out-of-date or when a user device receives a request from the user to receive data). In some embodiments, information may include user information. For example, the user information may include current and/or historical user activity information (e.g., what communications the user engages in, what times of day the user sends/receives messages, whether the user interacts with a social network, at what times the user interacts with a social network to post information, what types of content the user typically inserts in messages, stored contacts of the user, frequent contacts of the user, any other suitable information, or any combination thereof). In some embodiments, the user information may identify patterns of a given user for a period of more than one year.

In some embodiments, an application may include an application program processor implementing some of the processes and methods disclosed herein as a stand-alone application implemented on user device 720. For example, the application may be implemented as software or a set of executable instructions, which may be stored in storage (e.g., storage 608) of the user devices (e.g., user device 600), and executed by control circuitry (e.g., control circuitry 604) of the user devices (e.g., user device 600). In some embodiments, an application may include an automatic program retrieval application that is implemented as a client/server-based application where only a client application resides on the user device, and a server application resides on a remote server (e.g., network entity 704). For example, an automatic program retrieval application may be implemented partially as a client application on user device 720 (e.g., by control circuitry 604 of user equipment device 600) and partially on a remote server as a server application running on control circuitry of the remote server (e.g., control circuitry of network entity 704). When executed by control circuitry of the remote server, the automatic program retrieval application may instruct the control circuitry to generate the displays and transmit the generated displays to user device 720. The server application may instruct the control circuitry of the remote device to transmit data for storage on user device 720. The client application may instruct control circuitry of the receiving user device to generate the application displays.

In some embodiments, the arrangement of system 700 is a cloud-based arrangement. The cloud provides access to services, such as information storage, messaging, or social networking services, among other examples, as well as access to any content described above, for user devices. Services can be provided in the cloud through cloud computing service providers, or through other providers of online services. For example, the cloud-based services can include a storage service, a sharing site, a social networking site, or other services via which user-sourced content is distributed for viewing by others on connected devices. These cloud-based services may allow a user device to store information to the cloud and to receive information from the cloud rather than storing information locally and accessing locally stored information. Cloud resources may be accessed by a user device using, for example, a web browser, a messaging application, a desktop application, a mobile application, and/or any combination of the same access applications. The user device may be a cloud client that relies on cloud computing for application delivery, or the user equipment device may have some functionality without access to cloud resources. For example, some applications running on the user device may be cloud applications (e.g., applications delivered as a service over the Internet), while other applications may be stored and run on the user device. In some embodiments, a user device may receive information from multiple cloud resources simultaneously.

In some embodiments, content database 420 may be configured as database 706. "User preference database," as referenced herein, may be configured as database 706 or a separate and different database, and user devices 100-500 may each be configured as user device 720.

The systems and processes discussed above are intended to be illustrative and not limiting. One skilled in the art would appreciate that the actions of the processes discussed herein may be omitted, modified, combined, and/or rearranged, and any additional actions may be performed without departing from the scope of the invention. More generally, the above disclosure is meant to be exemplary and not limiting. Only the claims that follow are meant to set bounds as to what the present disclosure includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method of temporarily downloading an application program from a website providing access to the application online for download to a user device, the method comprising:
   identifying an anticipated user activity based on user data corresponding to future activities of a user;
   determining a correspondence between the anticipated user activity and the website, wherein the website provides a feature set corresponding to the anticipated user activity and a downloadable application program to be automatically installed at the user device;
   identifying content of the website;
   setting, based on the identified content of the website, a predefined time period for detecting a user interaction with the downloadable application program;
   at the user device, automatically retrieving and installing the downloadable application program; and
   in response to detecting absence of user interaction with the downloadable application program on the user device within the predefined time period, automatically uninstalling the downloadable application program from the user device.

2. The method of claim 1, wherein the downloadable application program includes an enhanced feature set relative to the feature set of the website.

3. The method of claim 1, further including generating the user data from a dataset of a plurality of datasets, wherein each dataset is from a distinct user account.

4. The method of claim 1, wherein the anticipated user activity is based on content entity corresponding to a category of user interest based on user preferences.

5. The method of claim 1, wherein the website is publicly available.

6. The method of claim 1, further comprising automatically uninstalling the downloadable application program from the user device in response to a user reaction or a detected application program content change.

7. The method of claim 1, wherein the predefined time period is extended in response to a user interaction with the downloadable application program.

8. The method of claim 1, further comprising detecting absence of user interaction with the website during the predefined time period.

9. The method of claim 1, wherein determining a correspondence between the anticipated user activity and the website is based on a natural language string search.

10. The method of claim 1, wherein determining a correspondence between the anticipated user activity and the website is based on prior user access to the website, and the prior user access to the website is tracked using cookies.

11. A system for temporarily downloading an application program from a website providing access to the application online for download to a user device, the system comprising:
 input circuitry configured to receive data from one or more corresponding data sources; and
 control circuitry configured to:
  identify an anticipated user activity based on user data corresponding to future activities of a user;
  determine a correspondence between the anticipated user activity and the website, wherein the website provides a feature set corresponding to the anticipated user activity and a downloadable application program to be automatically installed at the user device;
  identify content of the website;
  set, based on the identified content of the website, a predefined time period for detecting a user interaction with the downloadable application program; and
  automatically retrieve and install the downloadable application program and in response to detecting absence of user interaction with the downloadable application program on the user device within the predefined time period, automatically uninstall the downloadable application program from the user device.

12. The system of claim 11, wherein the downloadable application program includes an enhanced feature set relative to the feature set of the website.

13. The system of claim 11, wherein the control circuitry is configured to generate the user data from a dataset of a plurality of datasets, wherein each dataset is from a distinct user account.

14. The system of claim 11, wherein the anticipated user activity is based on content entity in a database, wherein the content entity corresponding to a category of user interest based on user preferences.

15. The system of claim 11, wherein the website is publicly available.

16. The system of claim 11, wherein the control circuitry is further configured to automatically uninstall the downloadable application program from the user device in response to a user reaction or a detected application program content change.

17. The system of claim 11, wherein the predefined time period is extended in response to a user interaction with the downloadable application program.

18. The system of claim 11, wherein the control circuitry is further configured to detect absence of user interaction with the website during the predefined time period.

19. The system of claim 11, wherein the control circuitry is further configured to determine a correspondence between the anticipated user activity and the website based on a natural language string search.

20. The system of claim 11, wherein determining a correspondence between the anticipated user activity and the website is based on prior user access to the website, and the prior user access to the website is tracked using cookies.

* * * * *